United States Patent [19]

Morstadt

[11] 3,745,558

[45] July 10, 1973

[54] DATA GUARD CIRCUIT

[75] Inventor: Richard A. Morstadt, Elmhurst, Ill.

[73] Assignee: GTE Automatic Electric Laboratories Incorporated, Northlake, Ill.

[22] Filed: Feb. 28, 1972

[21] Appl. No.: 229,968

[52] U.S. Cl. .................... 340/347 DD, 340/146.1 R

[51] Int. Cl. .................................... G06f 3/00

[58] Field of Search ................ 340/347 DD, 345 D, 340/146.1 R; 235/155, 154

[56] References Cited

UNITED STATES PATENTS

| | | | |
|---|---|---|---|
| 3,386,079 | 5/1968 | Wiggins | 340/146.1 |
| 3,493,928 | 2/1970 | Juliusburger | 340/347 DD |
| 3,483,510 | 12/1969 | Widl | 340/146.1 D |
| 3,665,393 | 5/1972 | Brune | 340/146.1 BA |
| 3,551,885 | 12/1970 | Henzel | 340/146.1 BA |

*Primary Examiner*—Maynard R. Wilbur
*Assistant Examiner*—Jeremiah Glassman
*Attorney*—K. Mullerheim, R. J. Black et al.

[57] ABSTRACT

A circuit providing parallel-coded format receivers with good retention of character duration information and a high degree of immunity to channel noise, speech, and other channel energy that the receiver might detect, but which violate the parallel-code format or timing restrictions.

10 Claims, 1 Drawing Figure

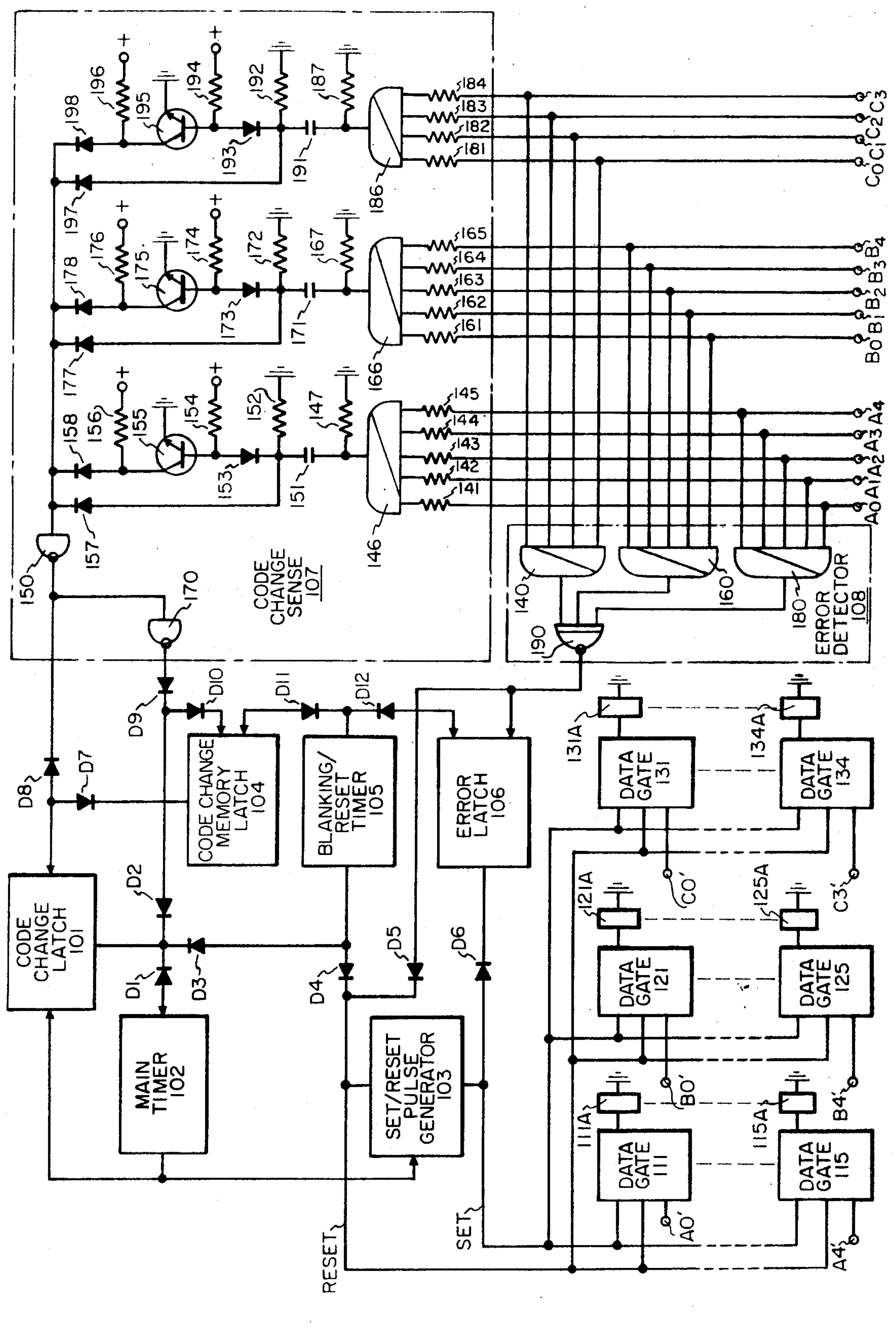
CODE CHANGE SENSE 107
ERROR DETECTOR 108
CODE CHANGE MEMORY LATCH 104
BLANKING/RESET TIMER 105
ERROR LATCH 106
CODE CHANGE LATCH 101
MAIN TIMER 102
SET/RESET PULSE GENERATOR 103
DATA GATE 131
DATA GATE 134
DATA GATE 121
DATA GATE 125
DATA GATE 111
DATA GATE 115
SET
RESET

DATA GUARD CIRCUIT

BACKGROUND OF THE INVENTION

1. Field of the Invention

This invention relates to data transmission and particularly to protection of data receivers from non-valid signals that may occur on a transmission channel.

2. Description of the Prior Art

Typical data receivers for operation in a parallel-coded format within the voice band either offer very little protection against character simulation as a result of transmission line noise or voice signals, or may cause considerable distortion of the transmitted character length. Such receivers are usually placed into one of two categories; unguarded and ungated, or guarded and gated.

Unguarded and ungated receivers offer only the very small degree of character simulation protection inherent in the receiver design. Such techniques include the use of automatic gain control amplifiers, band splitting or band rejection filters, signal limiters, channel filters and channel detectors. Additionally these receivers repeat any time skewing of multitone character information added during propagation to the receiver, resulting in distortion of effective character lengths.

So-called guarded and gated receivers provide adequate protection against character simulation, but destroy character duration information. This type of receiver is implemented in much the same manner as the unguarded and ungated receivers with additional circuitry to check the outputs of channel detectors for minimum signal duration and code errors, then timing the presentation of validated information to the output circuits. However, the character information that is present for more than the output timer period is lost thus the character length as received is not duplicated. The present data guard circuit when added to a conventional basic receiver provides good character simulation protection and retention of character duration information.

SUMMARY OF THE INVENTION

The present invention is a data guard circuit designed as an auxiliary or add on unit to provide otherwise unguarded parallel-coded format receivers, a high degree of immunity to channel noise, speech and other channel energy that the data receivers might otherwise detect, but which violate the parallel-code format or the timing of guard periods established for data transmission. The present invention permits standard production receivers such as those manufactured by GTE Automatic Electric Company and designated AE4011L and AE4011X and those manufactured by Western Electric Company and designated type 401J, to be used as sensitive code receivers. The requirement for a high of validity is particularly important in such systems as credit card verification, bank balance verification systems, etc. Systems such as this are built around the use of a pushbutton dial telephone as an input device.

The data guard circuit of the present invention does not alter the time duration of the received characters but delays its presentation to the external unit to which it is connected, by an amount equal to a period chosen for the guard.

The circuit of the present invention accepts parallel-coded character data from data receivers and checks it for errors. If the data information received remains error free during the guard period, the output circuits are simultaneously updated to a new character. If the data is in error the output circuits are unlatched or returned to their quiescent or no data condition, and will remain unlatched until the next error free character is detected.

Under no-signal conditions but with the presence of sufficient channel noise or the presence of speech, data receiver channel detectors normally will periodically operate causing the data guard circuit of the present invention to time and check each code change and reject invalid attempts to simulate a true data character.

The character information from the output of the channel detectors of typical data receivers as referenced above, is brought to the present data guard and presented to a sense code change circuit, error detector circuit, and to latching output circuits, the latter circuits being connected to some form of business machine. The sense code change circuit serves to determine any state change (valid or invalid), of the receiver channel detectors. All sensed changes are indicated by a pulse which is presented to a code change memory circuit and a code change latch circuit. The pulse causes the code change latch circuit to latch if it is not already in a latched condition from a previous code change pulse. If it is already latched, then the code change memory will latch and later cause the code change latch to recycle a main timer because there was a code change during its "busy" period. When the code change latch circuit does latch, it starts the main timer circuit. The main timer operating period is normally adjusted to approximately one-half the shortest expected character period, in order to sample the character at its least vulnerable point. Longer periods may be used if the application in which the present circuitry is utilized, dictates a greater assurance of sampling time.

When the main timer reaches the end of its period it generates a pulse which actuates a reset/set pulse generator which then provides reset and set pulses to the latching output circuits. On those output circuits in which a signal is present from the data receiver, the presence of the set pulse will cause the respective output circuits to latch, providing an output. That is to say the set command permits an output stage to latch if the stage input is true (i.e., if that data channel is detecting a signal).

However, if an error has been detected in the form of an inadequate number of signals from the data receiver, the set pulse will be inhibited and all the output stages will remain unlatched. The present invention is intended for data receivers that normally provide a three out of 14 coded output or alternately a two out of ten coded output. An error therefore in the former case would be the presence of less than three proper outputs from the receiver or in the latter case the presence of less than two proper outputs. An error is indicated by an error detector circuit when such parallel-code format is violated. If the error indication exists during the period between the occurrence of a blanking/reset pulse and the occurrence of the main timer pulse, then the error latch will be latched and the subsequent set pulse from the main timer will be prevented from reaching the output stages. Thus the output stages will be reset and remain unoperated during that period of a character that is in error.

The blanking/reset timer noted above generates a blanking/reset pulse which resets the internal circuitry of the present invention. This pulse is generated at a fixed time after the main timer starts timing in response to a sense code change. The blanking/reset pulse occurs well before the main time pulse and effectively serves to blind the various circuits to imperfectly defined (in time) character edges. This operation is necessary because operation of the receiver detectors that define the characters in the data stream, may be skewed in time. Without such blinding they might invoke the error latch and code change memory for each character. Thus the time interval between the occurrence of the blanking/reset pulse and the occurrence of the main timer pulse is the guard period, when the code change memory will record an "earlier than expected" code change and the error latch will record a detected code error. Thus in this manner a character can reach the output of the present data guard circuitry only after satisfying the error detector circuit for the duration of the predetermined guard period.

BRIEF DESCRIPTION OF THE DRAWING

The single sheet of drawings appended hereto constitutes a combined block and schematic diagram of a data guard circuit in accordance with the present invention.

DESCRIPTION OF A PREFERRED EMBODIMENT

As noted previously, the present invention acts as an interface between a code receiver and output devices such as relays which, in normal practice, are connected directly to the receiver output. Referring now to the accompanying drawing, a description of a preferred embodiment of the present invention will be presented.

In the invention as shown, input terminals from an associated data receiver are provided. These terminals designated A0, A1 through A4 inclusive, B0, B1 through B4 inclusive and C0, C1 through C3 inclusive represent the appropriate terminals for a receiver capable of operating on a three out of 14 coded basis. Connected to the same terminals but shown separately for the sake of convenience are inputs to three groups of latching output circuits or data gates designated A0' through A4', B0' through B4' and C0' through C3'. These terminals are connected to data gates 111 through 115, 121 through 125 and 131 through 134 respectively.

The data gates referred to above each consist of a latch circuit of conventional design, the details of which do not form a portion of the present invention. Each data gate in addition to having an input from the data terminals as described above, further includes both set and reset inputs for operational purposes. Each data gate has a single output connected to an associated relay such as relays 111A through 115A, etc. It is the ultimate operation of these relays by the present invention that will cause a contact closure to an external circuit such as a business machine, computer, etc., capable of utilizing the advantages of the present invention. For sake of clarity, the contacts associated with the above described relays and their connections to external circuitry have not been shown.

Coupled to the input terminals A0 through A4, B0 through B4 and C0 through C3, is the code change sense circuit 107. The code change sense circuit includes three similar circuit configurations. Each of these circuit configurations is connected to one group of terminals viz: A, B or C. For purposes of the present description the circuit configuration connected to the A terminals only will be discussed. Each of the terminals A0, A1, A2, A3 and A4 is connected through a resistor 141, 142, 143, 144 and 145 respectively to an OR gate 146. Each of these resistors has a different value. In the present embodiment resistor 141 is 221 ohms, resistor 142 is 681 ohms, resistors 143 is 1,300 ohms, resistor 144 is 2,430 ohms and resistor 145 is 4,750 ohms. The output from gate 146, taken when a potential is present on one of the leads in the A group, is applied to resistor 147 forming a voltage divider at the output of OR gate 146. A differentiator circuit, consisting of capacitor 151 and resistor 152, is also connected to the output of the OR gate. The differentiator circuit output is then connected at the junction of diodes 153 and 157 to a fullwave rectifier circuit that includes the two aforementioned diodes as well as transistor 155, resistors 154 and 156 and diode 158. The output of the fullwave rectifier is taken through diode 157 and 158 and conducted to inverter 150. In similar manner the circuit configurations connected to the B and C group of terminals also have their outputs connected to inverter 150. Connected to the output of inverter 150 is a second inverter circuit 170 which reinverts the output of inverter 150. Outputs, from the code change sense circuit 107, of opposite polarities are derived from inverters 150 and 170 respectively.

Also connected to the three groups of input terminals is the error detector 108. The error detector includes three OR gates 180, 160 and 140 connected to the A, B and C groups of terminals respectively. The outputs of these OR gates are connected to a NAND gate 190 where the output from the error detector circuit 108 is connected to error latch 106.

In addition to the data gate latch circuits described previously three additional latch circuits are included in the present invention. These are the code change latch 101, the code change memory latch 104, and the error latch 106. Each of these circuits has two inputs (latch and unlatch) and a single output. The detailed circuitry of each of these latch circuits is conventional in nature and does not form a portion of the present invention.

The code change latch 101 is initially operated or latched in response to receipt of a potential indicating a code change from the code change sense circuit 107. Its output is utilized to start operation of main timer 102 and blanking reset timer 105. Its output is also utilized to condition code change memory latch 104, for operation from inverter 170. The code change latch 101 is reset or unlatched in response to an output from the main timer 102.

The code change memory latch 104 is operated or latched from the code change sense circuit 107 through inverter 170 if an inhibt signal from code change latch 101 is not present at its input. Thus the code change memory latch 104 is only permitted to operate when a code change is already being acted upon. Output from code change memory latch 104 is utilized to retain code change latch circuit 101 in its operated condition in spite of the presence of a reset signal from main timer 102. The code change memory latch 104 is reset over its reset lead from a signal extending from blanking/reset timer 105 extended through diode D11.

The error latch circuit receives its operate or latch signal from the error detector 108. Its output is connected to the set lead and acts to inhibit the output of set pulses from the set/reset pulse generator 103, when an error signal has been detected from the incoming code signals. The error latch is reset or unlatched by a signal from blanking/reset timer 105 conducted via diode D12.

The main timer 102 operates in response to an input from code change latch 101 and after a predetermined period of time produces an output pulse which is conducted to the code change latch 101 to reset it, and to the set/reset pulse generator to initiate operation. The detailed circuitry of main timer 102 is conventional in nature and as such does not form a portion of the present invention. However in at least one constructed embodiment of the present invention main timer 102 consisted of a unijunction transistor, the operation time of which was determined by the constants of the associated resistive and capacitive elements.

The blanking reset timer 105 is also initiated from the output of code change latch 101. It produces an output pulse of predetermined length that acts to reset code change memory latch 104 and error latch 106, preventing either of these circuits from operating for a predetermined period. Thus if the code change memory latch 104 or error latch 106 are operated prematurely, false operation will be prevented. The detailed circuitry of blanking/reset timer 105 is conventional in nature and as such does not form a portion of the present invention. However, in a constructed embodiment of the present invention the blanking/reset timer 105 consisted of a transistor switch whose operated time was determined by the constants of the resistive and capacitive components included therewith.

The set/reset pulse generator 103 operates in response to an output signal from main timer 102 to produce "set" and "reset" pulses of opposite polarity simultaneously for a predetermined period of time. These output pulses are applied to the reset and set leads where they are conducted to the data gates as described previously. The circuitry of the set/reset pulse generator 103 is also conventional in nature and as such does not form a portion of the present invention. However in a constructed embodiment of the present invention the set/reset pulse generator consists of a monostable multivibrator circuit. The input is connected to main timer 103 and outputs of opposite polarity are conducted to the reset and set leads respectively.

In the present instance assume that the data guard and data gate circuits are in the process of receiving three coded signals, one in the A, one in the B and one in the C group, over terminals A0, B0 and C0 and that no prior changes have occurred as of this time. With the application of signals their pressence is recognized by virtue of a voltage change occurring, for example, in the A group, due to current flow through one of the resistances 141 through 145. These resistances are all gated through OR gate 146 and the resultant output applied through capacitor 151 to the input of a fullwave rectifier circuit that comprises transistor 155, diodes 153, 157 and 158 and associated biasing resistances 154 and 156.

The output from the fullwave rectifier is applied to inverter 150 where the signal operating levels are stabilized at values for operation of the remaining circuitry. In similar manner the output from inverter 150 is also applied to inverter 170 which functions in like manner. Initially signals will be applied through diode D8 to code change latch 101. Simultaneously a signal will be applied through diodes D9 and D10 from inverter 170 to code change memory latch 104.

Since there have been no previous code changes the code change latch 101 will, through diode D2, inhibit application of the pulse from diode D9 preventing operation of code change memory latch 104 at this time. Operation of code change latch 101 will apply operating potential through diode D1 to main timer 102 causing it to start its timing cycle. At the same time the output from code change latch 101, will through diode D3 start the operation of blanking/reset timer 105, which will via diodes D11 and D12 prevent operation of both code change memory latch 104 and error latch 106 for the duration of the blanking reset timer period.

At the end of its timing period main timer 102 will produce an output pulse which is conducted to the input of the set/reset pulse generator 103. The set/reset pulse generator which is a monostable multivibrator will operate to simultaneously produce two pulses, a set and reset pulse of opposite polarity which are in turn extended via the set and reset leads to all of the data gates. Those gates (111, 121, 131) in each group which have an operating potential on their respective data inputs, viz: A0′, B0′ and C0′, will then operate latching up to operate their associated relays such as 111A, 121A and 131A.

Assuming now that the above sequence is incomplete and that a change occurs. This change is a change of signal from terminal A0 to A1 in the A group. Code change latch 101 being operated from the previous change will not provide an inhibit signal to code change memory latch 104. Therefore the new code change signal will be taken through inverter 170 and applied through diode D9 and diode D10 to the input of code change memory latch 104 causing it to latch up. At such time as the main timer 102 completes its timing function and resultant operation of the set/reset pulse generator 103 with operation of the associated data gates over the reset and set leads, the code change latch 101 will attempt to reset (at the completion of the main timer cycle). However because of the operation state of code change memory latch 104 an output potential through diode D7 will prevent the resetting of code change latch 101 and cause it to remain in its set or operated state. With code change latch 101 in its operated state the blanking/reset timer 105 was reoperated by the set/reset pulse generator via diode D thus resetting code change memory latch 104 and error latch 106. The main timer 102 is allowed to recycle and the above described sequence is repeated.

If at any time no signals are present in any one or more of the three coded inputs, an inhibit signal that is normally present on one of the inputs to error latch 106 will be replaced by an operate signal. This may be seen by noting that the input signal terminals A0, A1, etc., are connected to OR gates 140, 160 and 180 whose outputs are commoned into NAND gate 190. From this arrangement it is obvious that a NOT signal is normally present at the input of error latch 106. When a signal is no longer present in one of the three input groups an output indication is removed from one of the three gates 140, 160 or 180 and therefore NAND gate 190 will reverse its output and provide a true output to the error latch 106.

It should be noted however if an error signal develops during that period of time when set/reset pulse generator 103 is providing an output, the reset signal is also applied through diode D5 to the input of error latch 106 and effectively inhibits the application of an operate pulse from NAND gate 190. As soon as the set/reset pulses have been generated, the inhibit will be removed and if the error is still present, the error latch 106 will be set. If during this sequence the main timer 102 operates to produce an output pulse to operate the set/reset pulse generator 103 only the reset output pulse will be transmitted to the data gates because of an inhibit from error latch 106 on the set lead provided through diode D6. In this manner false data will not be presented to the data gates. As soon as valid signals again appear in all three groups the input from NAND gate 190 will be reversed and error latch 106 will be restored to its normal state.

What is claimed is:

1. Data guard means for connection between a data receiver and a business machine, said data receiver connected to a communication channel, and including a plurality of groups of outputs, said data receiver operated in response to periodic receipt of signals representative of coded characters from said communication channel, to produce one output signal in each of said groups, and said data guard means connectable to said data receiver outputs, said data guard means comprising: code change detection means connected to said data receiver outputs; a plurality of data output circuits each including an input connection to one of said data receiver outputs, and each including an output connection to said business machine, said data output circuits individually conditioned for operation in response to said output signals from said data receiver; timing means connected between said code change detection means and each of said data output circuits; said timing means operated in response to said code change detection means detecting a periodic output signal change in at least one of said data receiver output groups, to operate said conditioned data output circuits after a predetermined period of time, whereby coded output indications are transmitted to said business machine; and error detection means connected to said data receiver outputs, and including an output circuit connected to said timing means; said error detection means operated in response to an absence of an output signal in any of said data receiver output groups to inhibit said timing means, thereby preventing operation of said conditioned data output circuits after said timing means predetermined period.

2. Data guard means as claimed in claim 1 wherein said code change detection means comprise: a code change sensing circuit connected to said data receiver outputs and a code change latch circuit connected between said code change sensing circuit and said timing means, said sensing means operated in response to a periodic output signal change in at least one of said data receiver output groups, to operate said code change latch; operation of said code change latch circuit effective to initiate operation of said timing means; and said timing means operated after a predetermined period to reset said code change latch circuit.

3. Data guard means as claimed in claim 2 wherein said code change sensing circuit comprises: a plurality of digital-to-analog conversion circuits each connected to one of said groups of data receiver outputs; a plurality of differentiating circuits each connected to one of said digital-to-analog conversion circuits and a plurality of rectifier circuits each connected to a different one of said plurality of differentiating circuits, each of said rectifier circuits including circuit connections to said code change latch circuits.

4. Data guard means as claimed in claim 2 wherein there is further included: a code change memory latch including an input circuit connection from said code change sensing circuit and an output connection to said code change latch; said code change memory latch operated in response to said code change sensing circuit to prevent resetting of said code change latch circuit in response to said timing means when a further output signal change occurs in at least one of said data receiver output groups prior to operation of said conditioned data output circuits by said timing means.

5. Data guard means as claimed in claim 1 wherein said data output circuits each comprised: a data gate latch circuit including circuit connections to said data receiver outputs and to said timing means; and a relay connected to said data gate latching circuit; each of said relays including switching means connected to said business machine.

6. Data guard means as claimed in claim 1 wherein said timing means comprise: a first timer actuated by said code change detection means, and operated after a predetermined period of time; and a pulse generator connected between said first timer and each of said data output circuits, operated in response to operation of said first timer to generate first and second pulses for transmission to each of said data output circuits.

7. Data guard means as claimed in claim 6 wherein said timing means further include: a second timer including input circuit connections from said code change detection means and an output connection to said code change detection means, operated in response to said code change detection means detecting a signal change in at least one of said data receiver output groups, to inhibit further operation of said code change detection means for a predetermined period of time.

8. Data guard means as claimed in claim 1 wherein said error detecting means comprise an error detector connected to each of said data receiver outputs and an error latch circuit connected between said error detector and said timing means; said error latch circuit operated in response to said error detector detecting the absence of an output signal in at least one of said data receiver output groups, to inhibit operation of said timing means after said timing means predetermined period.

9. Data guard means as claimed in claim 8 wherein said error detector comprises: a plurality of OR gate circuits each connected to one of said data receiver output groups; and a NAND gate connected between the output of each of said OR gates and said error latch.

10. Data guard means as claimed in claim 8 wherein there is further included: a second timer operated in response to said code change detection means to inhibit initial operation of said error latch in response to said error detector.

* * * * *